United States Patent
Spiesberger

(10) Patent No.: US 11,794,267 B2
(45) Date of Patent: Oct. 24, 2023

(54) WELDING TORCH COMPRISING A DEVICE FOR FEEDING A CONSUMABLE WELDING WIRE TOWARDS THE TOOL CENTER POINT

(71) Applicant: Fronius International GmbH, Pettenbach (AT)

(72) Inventor: Alfred Spiesberger, Pettenbach (AT)

(73) Assignee: Fronius International GmbH, Pettenbach (AT)

( * ) Notice: Subject to any disclaimer, the term of this patent is extended or adjusted under 35 U.S.C. 154(b) by 0 days.

(21) Appl. No.: 17/917,646

(22) PCT Filed: Aug. 30, 2021

(86) PCT No.: PCT/EP2021/073859
§ 371 (c)(1),
(2) Date: Oct. 7, 2022

(87) PCT Pub. No.: WO2022/043544
PCT Pub. Date: Mar. 3, 2022

(65) Prior Publication Data
US 2023/0143776 A1    May 11, 2023

(30) Foreign Application Priority Data
Aug. 31, 2020 (EP) .................................. 20193674

(51) Int. Cl.
*B23K 9/12* (2006.01)
*B23K 9/167* (2006.01)
(52) U.S. Cl.
CPC .............. *B23K 9/124* (2013.01); *B23K 9/167* (2013.01)
(58) Field of Classification Search
CPC .......... B23K 9/28; B23K 9/133; B23K 9/124; B23K 9/167
See application file for complete search history.

(56) References Cited

U.S. PATENT DOCUMENTS

| 2,644,070 A * | 6/1953 | Herbst | B23K 9/167 219/74 |
| 2,710,902 A * | 6/1955 | Pilia | B23K 9/167 219/74 |

(Continued)

FOREIGN PATENT DOCUMENTS

| CN | 201702197 U | 1/2011 |
| CN | 205147554 U | 4/2016 |

(Continued)

OTHER PUBLICATIONS

International Search Report in PCT/EP2021/073859, dated Dec. 21, 2021.

(Continued)

*Primary Examiner* — Brian W Jennison
(74) *Attorney, Agent, or Firm* — Collard & Roe, P.C.

(57) ABSTRACT

A welding torch includes a torch body and at least one device for feeding a consumable welding wire towards the tool center point that has an attachment device for attachment to the torch or an element connected thereto. A base support, which is connected to the attachment device, includes at least two deflection elements for guiding the wire towards the center point. The at least two deflection elements are arranged on the base support so that a first wire path length from the last deflection element located closest to the center point to the center point is shorter than a second wire path length between the last deflection element and a further deflection element as viewed counter to a main wire feed direction, and so that the arcuate wire has a greater segment height along the second path length than the segment height along the first path length.

19 Claims, 10 Drawing Sheets

(56) References Cited

U.S. PATENT DOCUMENTS

| | | | |
|---|---|---|---|
| 2,723,331 A | 11/1955 | Tyrner | |
| 2,778,099 A * | 1/1957 | Anderson | B23K 9/167 228/244 |
| 3,102,947 A * | 9/1963 | Blackman | B23K 9/1336 219/137.52 |
| 3,830,996 A | 8/1974 | Ullmann et al. | |
| 4,532,406 A * | 7/1985 | Povlick | B23K 9/167 219/136 |
| 4,536,634 A * | 8/1985 | Nawa | B23K 9/296 219/136 |
| 6,841,752 B2 * | 1/2005 | Ward | B23K 9/167 219/136 |
| 8,026,456 B2 * | 9/2011 | Achtner | B23K 9/295 219/137.2 |
| 2016/0121423 A1 * | 5/2016 | Hubinger | B23K 9/126 219/137.31 |
| 2018/0036825 A1 * | 2/2018 | Wada | B23K 9/173 |

FOREIGN PATENT DOCUMENTS

| | | |
|---|---|---|
| CN | 105562901 A | 5/2016 |
| CN | 109205249 A | 1/2019 |
| EP | 2 644 306 A1 | 10/2013 |
| EP | 3 017 901 B1 | 1/2019 |
| GB | 735 707 A | 8/1955 |
| GB | 1320356 A | 6/1973 |
| JP | H11-342471 A | 12/1999 |

OTHER PUBLICATIONS

European Search Report dated Apr. 9, 2021 in European Application No. 20193674.7 with English translation of the relevant parts.

Chinese Office Action in Application No. 202180030745.0, issued by the CNIPA dated Apr. 19, 2023 with an English translation thereof.

* cited by examiner

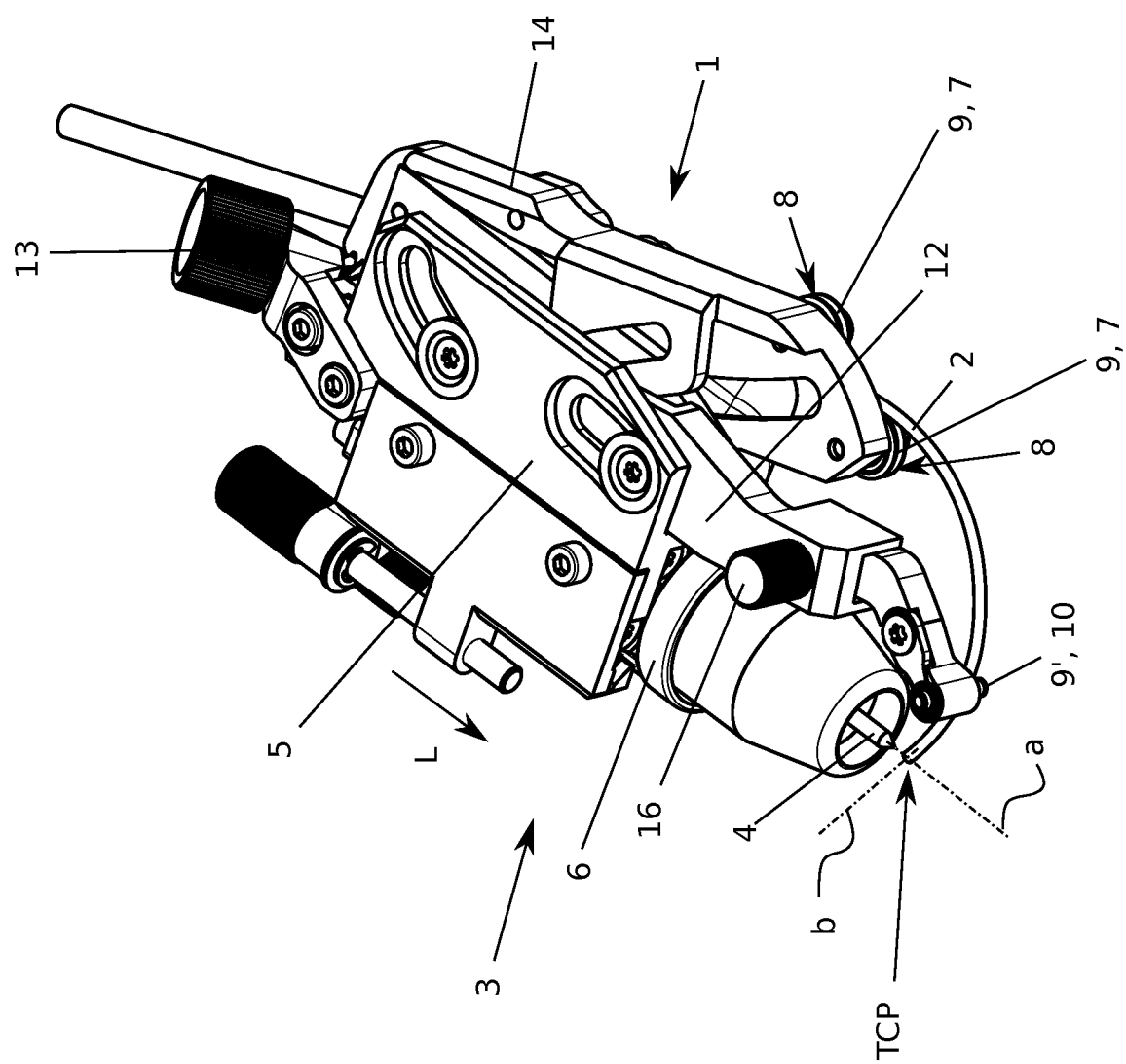

WELDING TORCH COMPRISING A DEVICE FOR FEEDING A CONSUMABLE WELDING WIRE TOWARDS THE TOOL CENTER POINT

CROSS REFERENCE TO RELATED APPLICATIONS

This application is the National Stage of PCT/EP2021/073859 filed on Aug. 30, 2021, which claims priority under 35 U.S.C. § 119 of European Application No. 20193674.7 filed on Aug. 31, 2020, the disclosure of which is incorporated by reference. The international application under PCT article 21(2) was not published in English.

The invention relates to a welding torch, in particular a TIG welding torch, comprising a torch body and at least one device for feeding a consumable welding wire towards the tool center point (TCP), wherein at least one feed device has an attachment means for attachment to the welding torch or an element connected thereto, and comprising a base support, which is connected to the attachment means and comprises at least two deflection elements for guiding the welding wire towards the tool center point (TCP).

The present invention includes various welding torches comprising a non-consumable electrode, wherein the arc burns between the temperature-resistant, non-consumable electrode and a workpiece to be machined, or also laser welding torches, in the case of which the consumable welding wire, which is fed by means of at least one feed device, is melted with the help of a laser beam, or combined welding torches, so-called hybrid welding torches, plasma torches, or oxy-fuel welding torches; thus welding torches for the fusion welding, in the case of which the majority of the welding energy is fed to the welding point essentially independently of the welding wire. The material for filling a gap between two workpieces or for applying to the surface of the workpiece during the deposition welding (so-called cladding) is fed via at least one wire-shaped welding wire made of consumable material, which is introduced into the arc and/or laser beam, respectively, of a plasma column or flame, where a heat-up and liquefaction of the welding wire takes pale. The at least one consumable welding wire and the central axis of the welding torch (for example the longitudinal axis of the non-consumable electrode or the longitudinal axis of the laser) intersect with one another in the so-called tool center point (TCP). In the case of the welding methods comprising a non-consumable electrode, the TIG (tungsten inert gas) welding method comprising at least one tungsten electrode is most common. Welding methods comprising a non-consumable electrode are used, for example, for the processing of nonferrous metals (e.g. aluminum, copper, and brass) or stainless steels, whereby a particularly high quality of the welding seam results.

For example, EP 3 017 901 B1 describes a TIG welding torch comprising a particularly compact torch head, which is suitable in particular for the deposition welding in the interior of pipes. The feeding of the additional material in the form of at least one consumable welding wire to the TCP takes place here via pipes, which can be adjusted to a certain extent. When the TCP remains constant, the torch head comprising the non-consumable electrode can be pivoted over a certain angular range. Due to the pipes, the welding wire experiences a relatively high friction during the feeding.

In the case of known welding torches, the feeding of the consumable welding wire mostly has a relatively large construction and causes relatively high friction during the wire feeding. A setting of the feed angle, thus of the angle between the longitudinal direction of the consumable welding wire and the central axis of the welding torch, is only possible with great difficulty for the user, if at all.

To reduce the friction of the wire feeding, there are also feed devices comprising rollers, as described, for example, in JP H11-342471 A. However, the relatively large, required installation space, which ultimately allows the fed welding wire to vibrate about its static rest position during the welding process and can thus lead to an unstable welding process, is a disadvantage of this feed device.

CN 205147554 U describes a welding torch comprising a non-consumable electrode and a device for feeding a consumable welding wire. The feed device includes the drive motor, whereby the construction takes up a relatively large amount of space. The adjustment options are limited and can only be carried out with relatively high effort.

The object of the present invention thus consists in the creation of an above-mentioned welding torch comprising at least one device for feeding a consumable welding wire towards the tool center point (TCP), wherein the feeding of the welding wire is to take place in a manner, which is as space-saving and low-friction as possible. Disadvantages of known welding torches are to be avoided or at least reduced.

The object according to the invention is solved by means of an above-mentioned welding torch comprising at least one feed device for the consumable welding wire, wherein the at least two deflection elements are arranged on the base support in such a way that a first path length of the welding wire from the last deflection element located closest to the tool center point (TCP) to the tool center point (TCP) is shorter than a second path length of the welding wire between the last deflection element and a further deflection element as viewed counter to a main feed direction of the welding wire, and that the at least two deflection elements are further arranged on the base support in such a way that the welding wire, which runs arcuately, has a greater segment height along the second path length than the segment height along the first path length. Due to the geometric conditions for the at least two deflection elements of the at least one feed device, an optimal and simple guidance of the welding wire is possible. In addition, the small installation space, which, in addition to the geometric arrangement of the deflection elements, ensures that the fed welding wire does not vibrate about its static rest position and leads to a more stable welding process, is an advantage of this feed device. The deflection elements can be arranged directly on the base support and can be connected to the latter, or can also be arranged on an element, for example a roller support, which is connected to the base support, and can be connected to said element. The term deflection element includes various means, which cause a change in direction to the consumable welding wire and which, for this purpose, exert a force or a torque or bending moment, respectively, on the welding wire. Such deflection elements can be edges, surface regions, pins, rollers, or the like, which contact the welding wire, which is to be fed, and which influence the feed direction thereof. Several deflection elements can also be formed by means of an element, on which the welding wire is contacted and deflected twice or repeatedly. Only guide elements, which do not contact the welding wire or contact it without significant force, are not included in the term of the deflection elements. It is significant that the first path length of the welding wire from the last deflection element to the TCP is shorter than the second path length of the welding wire from the last deflection element to a further deflection element as viewed counter to the main feed direction of the welding wire. The segment height of the welding wire, which runs arcuately, along the second path length is furthermore greater than the segment height of the welding wire along the first path length. Due to these conditions and the relatively small first path length, thus the length, which the welding wire is unguided or is arranged freely from the last deflection element to the TCP, respectively, a particularly exact feeding of the welding wire towards the TCP and a slight tendency to vibrations or lateral deflections of the welding wire also results. The friction during the feeding of the welding wire can be minimized by the use of suitable deflection elements. In addition, the friction is reduced by the arrangement of a space for movement for the welding wire, in particular at the point of the maximum segment height, in particular when using welding wires of different thicknesses or consisting of different materials, respectively. The main feed direction of the welding wire is understood to be the feed direction towards the TCP. In the case of different welding methods, a feeding of the welding wire away from the TCP, thus a backwards movement, can also result at times. Averaged over time, however, the feeding towards the TCP, thus in the main feed direction, is always predominant because the material has to be melted for the purpose of forming the welding seam or a coating layer. For certain applications, the feed device can also be formed for feeding several consumable welding wires.

When at least one deflection element, preferably the last deflection element, is adjustable in a direction essentially transversely to the base support, an adjustment of the consumable welding wire relative to the molten bath, for example for compensating component tolerances or for setting the optimal feeding of the welding wire towards the TCP, respectively, for reaching the required welding seam quality, can take place. Transversely to the base support essentially means here at a right angle to the plane, in which the welding wire with the second path length runs.

For this purpose, the adjustable arrangement of a deflection element includes suitable technical solutions, such as deformable materials. For instance, a flexible base support could thus simply be bent in order to bring the deflection element, which is arranged on the base support, into the desired position.

When, in addition to the last deflection element, at least two deflection elements are provided, between which the welding wire can be guided, a particularly suitable feeding of the consumable welding wire towards the TCP can take place.

To be able to change the feed angle of the welding wire towards the TCP with essentially constant TCP, the position of at least one deflection element can preferably be changed relative to or with respect to the base support, respectively. Due to the change of the position of the at least one deflection element, the first path length of the welding wire is adjusted in relation to the second path length of the welding wire, and the segment height as well as the curvature (thus the deviation of the curve of the welding wire from a straight line) or the course of the curvature of the welding wire, respectively, is also adjusted. In order to be able to influence the feed angle of the welding wire particularly well when the installation space is given, and in order to provide the welding wire with a minimum pre-tension so that the latter can be guided securely along the deflection elements, the segment height of the second path length is preferably more than 2 mm. An adjustment of the feed angle can be advantageous or necessary for certain welding processes and can contribute to an improvement of the weld quality. The adjustability of the position of at least one deflection element relative to the base support can take place gradually or also continuously by means of various constructions. Ideally, the feed angle of the welding wire can be adjusted between 30° and 120°, preferably between 40° and 70°. Due to a range of this type of the feed angle, all possible welding tasks can be performed with an optimal position for the welding wire with respect to the non-consumable electrode.

For example, the position of at least one deflection element can be changed in that different base supports are provided, which in each case comprise at least two deflection elements for attaining different feed angles, which can be selected and assembled, as required. For example, three different base supports can be manufactured for three different feed angles and can be included in the delivery of the feed device, so that the welder can realize the corresponding feed angle of the consumable welding wire as desired by exchanging the corresponding base support of the feed device.

Alternatively, the position of at least one deflection element can also be changeable in that at least one deflection element is arranged on a roller support or is supported by a roller support, respectively, which roller support is adjustably arranged on the base support or is supported by the base support, respectively. By adjusting the roller support by means of the at least one deflection element with respect to the base support, a change of the feed angle and a regulation of the segment height of the consumable welding wire can thus be attained.

In the case of the above-mentioned embodiment, the roller support can be adjustable continuously relative to the base support along an arcuate slotted guide path. The roller support is thereby fixed in the desired position for a certain feed angle. The fixation preferably takes place by means of corresponding easily closable and openable quick-release fasteners or the like.

For a gradual adjustment of the feed angle of the welding wire to the TCP, the roller support can also be capable of being connected to the base support in several different positions. For example, various holes in which the roller support can be arranged, can be arranged on the base support for some feed angles.

Alternatively, roller supports, which are formed differently, can be prefabricated and can be connected to the base support in order to attain different feed angles.

According to a further feature of the invention, the last deflection element can be arranged on a pin support, which is connected, preferably adjustably, to the base support. The pin support, together with the last deflection element, can be adjustably arranged by means of corresponding adjusting screws or the like, for example in order to be able to compensate tolerances.

In an advantageous way, the position of at least one deflection element can be changed in that the deflection elements arranged on the roller support and the last deflection element arranged on the pin support are arranged coupled to one another so as to be capable of being adjusted with respect to the base support. For the attainability of a continuous adjustment of the feed angle of the welding wire to the TCP, the deflection elements can be arranged movably to one another or adjustably in a kinematically coupled manner, respectively. The position of the at least two deflection elements can thus be made simultaneously by means of a single adjustment, which can take place, for example, manually by means of corresponding adjusting screws or also electrically by means of corresponding drive motors, in order to change the feed angle of the welding wire towards the TCP with essentially constant TCP.

The at least one deflection element, in particular the last deflection element, can be formed by means of at least one sliding pin, which is preferably mounted in a rotatable manner. This represents a suitable and particularly low-friction feed option of the welding wire. A minimal friction is attained by means of a rotatable mounting of the sliding pin. Due to the high temperatures, which are common during the welding, and due to the closeness of the sliding pin to the TCP, the bearing, however, should withstand these high temperatures. Due to the fact that the second path length is comparatively large, a comparatively small contact pressure of the welding wire is applied to the last deflection element, which does not mandatorily require a rotatable mounting of the sliding pin.

At least one deflection element can further be formed by means of at least one roller. To attain a particularly small friction during the feeding of the welding wire, it is advantageous when that one of the deflection elements, at which operatively the greatest bending moment occurs in the welding wire, is formed as rotatable roller, and the second path length is limited by means of this roller. The bearing of the rollers should also be formed in a temperature-resistant manner, in order to be able to withstand the high temperatures reached during the welding.

When at least one sliding pin has a groove for the welding wire and/or when at least one roller has a groove for the welding wire, respectively, an improved guidance of the consumable welding wire can be attained. The groove can have, for example, a V-shaped or U-shaped cross section, so that the welding wire bears on the respective deflection element only at particularly small surfaces or points, respectively.

When the attachment means is formed for the releasable and preferably rotatable connection to the welding torch or to an element connected thereto, a particularly flexible arrangement of the feed device with respect to the welding torch and an optimal adaptation to the respective welding task can take place.

The present invention will be described in more detail on the basis of the enclosed figures, in which:

FIG. 8 shows a different view onto the welding torch comprising the feed device according to FIG. 7;

Figure 1:
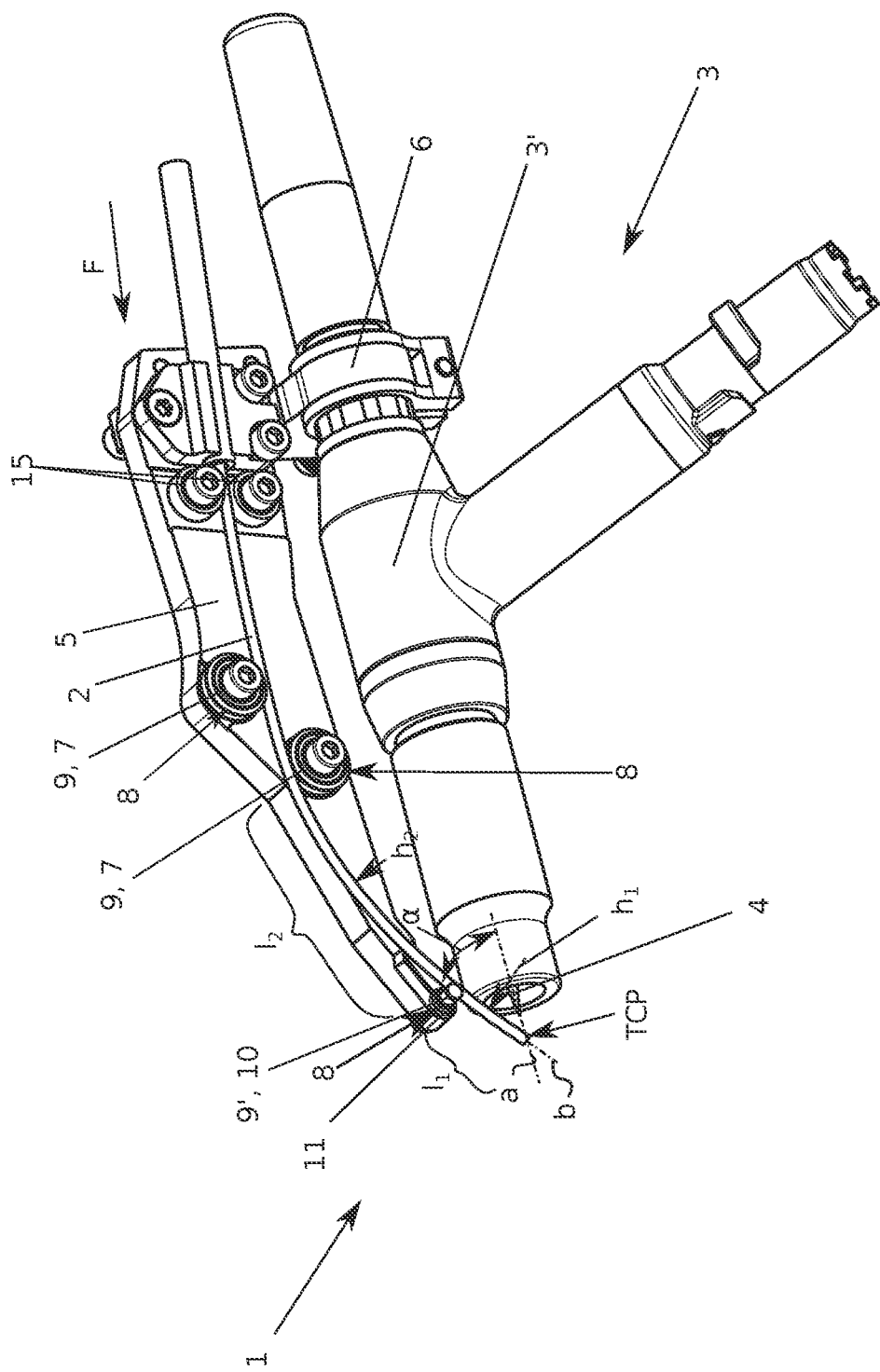
FIG. 1 shows a welding torch comprising a feed device attached thereto according to an exemplary embodiment in the case of an acute feed angle.

FIG. 1 shows a welding torch 3 comprising a feed device 1 attached thereto for feeding a consumable welding wire 2 towards the tool center point TCP according to a simple exemplary embodiment. The TCP can be part of a melting zone of the welding torch 3, wherein the melting zone is that zone, which is able to operationally consume the welding wire 2, which is fed to this zone, or the free end thereof, respectively, in a melting point of the path for the welding torch 2. In this case, a feed angle α of the welding wire 2 to the TCP, which is that angle, which the central axis a of the welding torch 3, thus in the case of a welding torch 3 comprising a non-consumable electrode 4, the longitudinal axis of the non-consumable electrode 4, draws with the longitudinal direction b of the consumable welding wire 2, is preferably an acute angle. Depending on the application, the feed angle α can be up to 180°. The longitudinal direction b of the consumable welding wire 2 is determined by the tangent to the welding wire 2 in the TCP. The welding torch 3 is in particular a TIG welding torch comprising a tungsten electrode as non-consumable electrode 4. However, laser welding torches or combined laser-arc welding torches as well as plasma torches and torches comprising a flame are also conceivable (not illustrated). In the event that the energy for a welding process is not supplied by an arc but, for example, by a laser, the feed angle or angle of attack, respectively, of the welding wire is to be understood as the angle occurring in the TCP or melting point, respectively, between the welding wire or a path for the welding wire, respectively, and the central alignment of the energy flow in the melting zone of the welding torch.

The feed device 1 includes an attachment means 6 for attachment to the welding torch 3 or to an element connected thereto. A base support 5 comprising at least two deflection elements 9, 9' for guiding the consumable melting wire 2 is connected to the attachment means 6. In the illustrated exemplary embodiment, the attachment means 6 is formed by means of a clamp, which encompasses the welding torch 3 and which surrounds the torch body 3'. Two rollers 7 are arranged on the base support 5 as deflection elements 9 for guiding the welding wire 2, and a deflection element 9' formed as sliding pin 10, which is last or which is closest to the TCP, respectively, are arranged on the base support 5. As will be described further below, the deflection elements 9, 9' can also be arranged indirectly and possibly adjustably on the base support 5 via further elements. The sliding pin 10 can have an external thread and can thus be adjusted essentially perpendicularly to that plane, in which the welding wire 2 lies along the second path length $l_2$, whereby the welding wire 2 can be positioned exactly in the melting zone. Further rollers 15 or deflection elements for guiding the welding wire 2 can furthermore be arranged on the base support 5. In order to keep the friction during the feeding of the welding wire 2 as low as possible, the rollers 7, 15 and possibly the sliding pin 10 are rotatably mounted. To guide the welding wire 2, the rollers 7, 15 can have grooves 8. The sliding pin 10 can also be formed with a groove 11. Even if a movement of the welding wire 2 away from the TCP is possible at times, the welding wire 2 is generally fed towards the tool center point TCP during the welding process and is melted there to form a welding seam between two workpieces or to form a coating on a workpiece (not illustrated). The feed direction of the welding wire 2 towards the tool center point TCP is identified as main feed direction F.

The deflection elements 9 formed by the rollers 7 and the last deflection element 9' formed by the sliding pin 10 are arranged on the base support 5 so that the welding wire is deflected at three points in such a way that a first path length $l_1$ of the welding wire 2 from the last deflection element 9' located closest to the tool center point TCP to the tool center point TCP is shorter than a second path length $l_2$ of the welding wire 2 between the last deflection element 9' and a further deflection element 9 as viewed counter to the main feed direction F of the welding wire 2. By means of a corresponding arrangement of the at least two deflection elements 9, 9' on the base support 5, the welding wire 2 has a greater segment height $h_2$ along the second path length $l_2$ than the segment height $h_1$ of the first path length $l_1$. Along the path length 12, the welding wire 2 has an essentially stronger or equal curvature than along the path length $l_1$.

In the case of an essentially constant TCP, the feed angle α of the welding wire 2 towards the tool center point TCP is advantageously adjustable. For this purpose, the deflection elements 9, 9' can be arranged on or towards the base support 5, respectively, so as to be capable of being adjusted in their position. The position of at least one deflection element 9, 9' can, for example, be changed in that different base supports 5 are provided, which in each case comprise at least two deflection elements 9, 9', for attaining different groups of positions of the deflection elements 9, 9' and thus different feed angles α, which can be selected and assembled, as required. Such an adjustability of the deflection elements 9, 9' can also be attained in that, for example, deformable materials are used as deflection elements 9, 9'.

Figure 2:
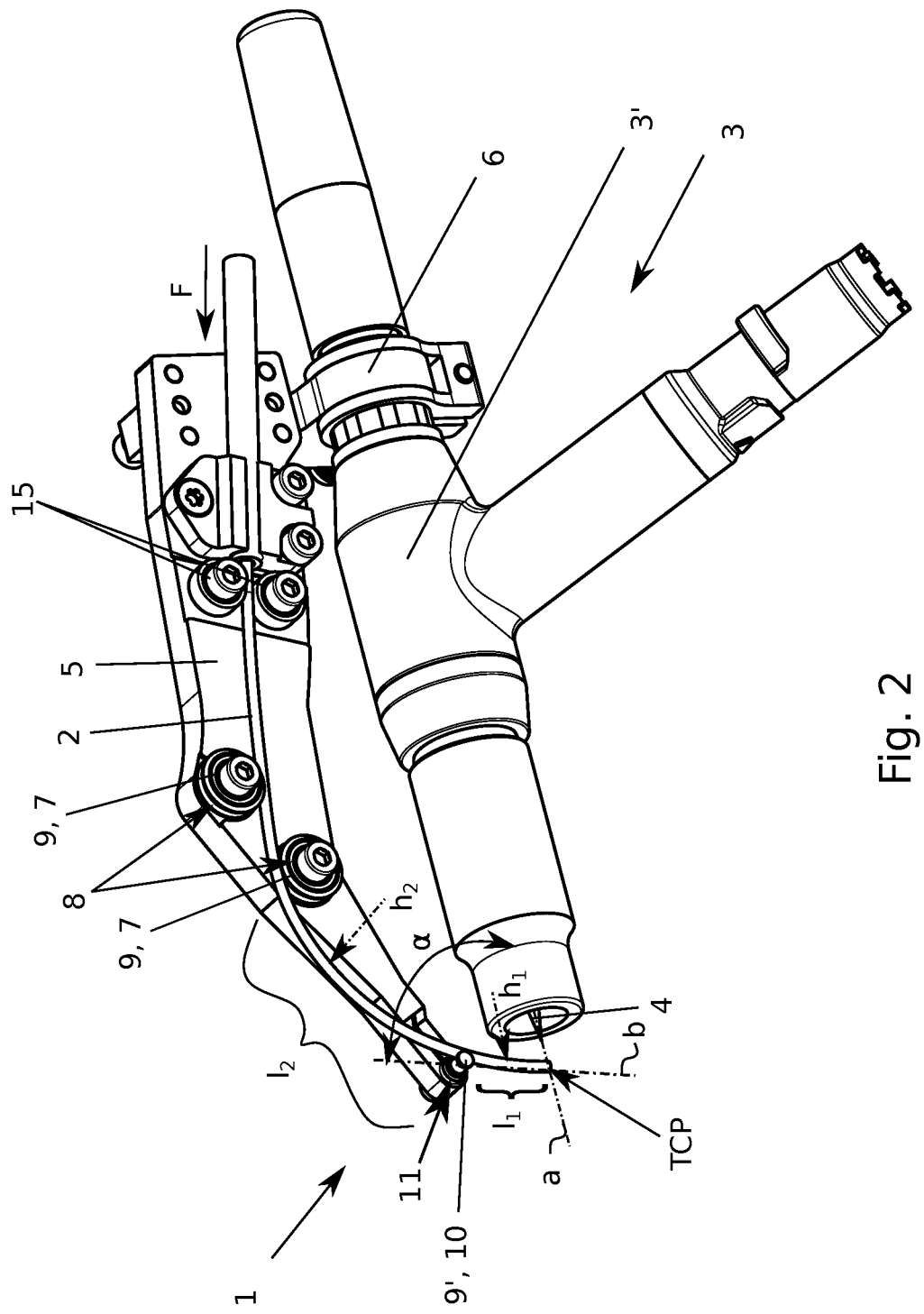
FIG. 2 shows the welding torch comprising the feed device according to FIG. 1 in the case of correspondingly adjusted deflection elements for attaining a greater feed angle.

FIG. 2 shows the welding torch 3 comprising the feed device 1 according to FIG. 1 comprising a different base support 5, by means of which other positions of the deflection elements 9, 9' and a greater feed angle α result. Due to the changed positions of the deflection elements 9, 9', the path lengths 11, 12 and the segment heights $h_1$, $h_2$ and the feed angle α change as well, but the TCP is essentially maintained in this case.

Figure 3:
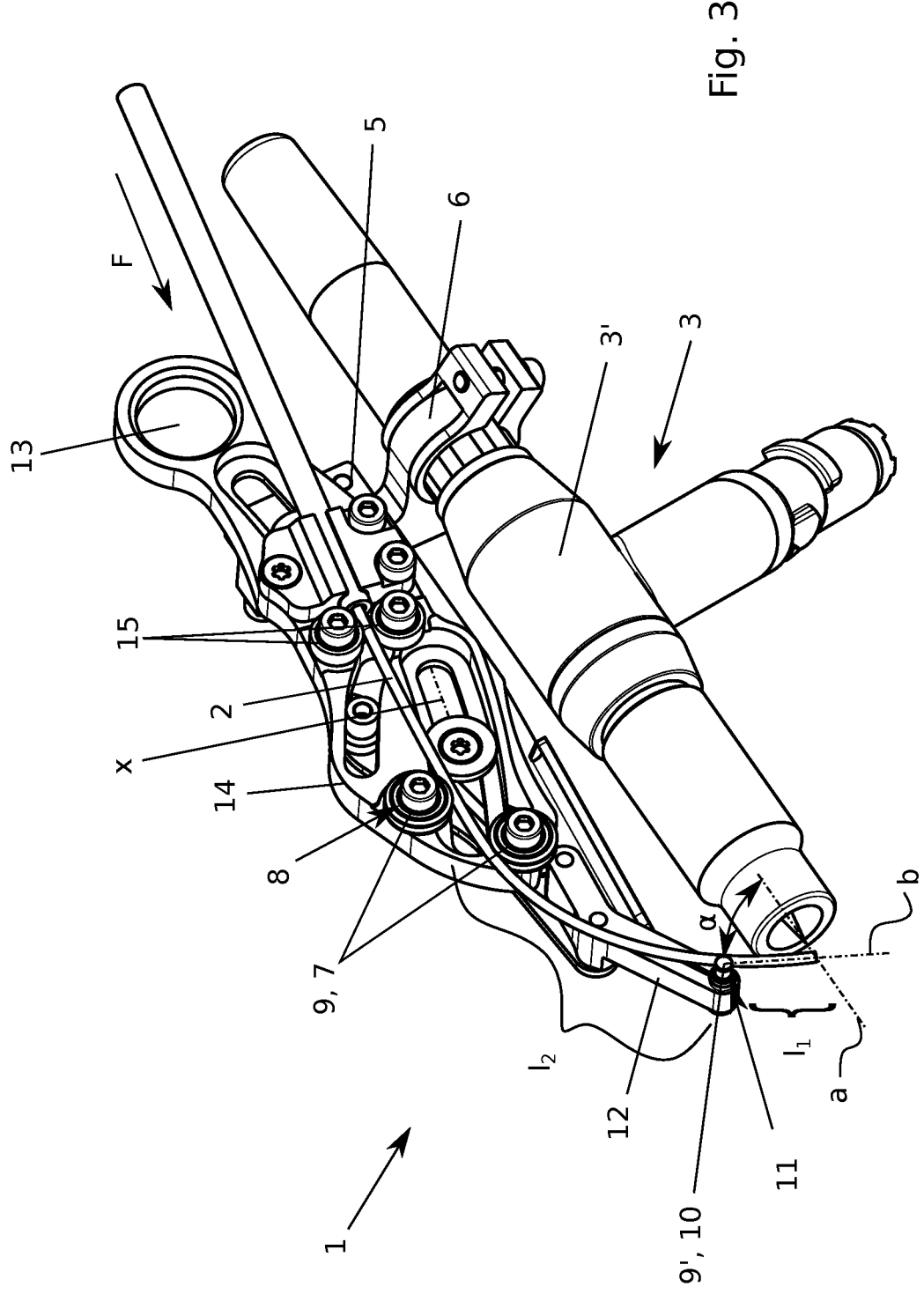
FIG. 3 shows a welding torch comprising a different exemplary embodiment of a feed device attached thereto comprising adjustable deflection elements.

FIG. 3 shows a welding torch 3 comprising a different exemplary embodiment of a feed device 1 attached thereto comprising adjustably arranged deflection elements 9, 9'. The two deflection elements 9, which are formed as rollers 7, are thereby attached to a roller support 14, which is arranged adjustably with respect to the base support 5, whereby different feed angles α of the welding wire 2 can be attained. The roller support 14 can be adjusted continuously along an arcuate slotted guide path x with respect to the base support 5. The adjustment of the feed angle α can take place in a particularly simple and quick way via a corresponding actuating element 13, whereby the roller support 14 comprising the rollers 7 and possibly further rollers 15 is moved along the accurate slotted guide path x with respect to the base support 5. The last deflection element 9' is attached to a pin support 12, which is connected accordingly to the base support 5. In response to movement of the roller support 14 with respect to the base support 5 along the accurate slotted guide path x, a change to the feed angle α of the consumable welding wire 2 towards the TCP results without essential change to the TCP. The first path length $l_1$ and the second path length $l_2$ and the first segment height $h_1$ and the second segment height $h_2$ are thus changed accordingly, so that the feed angle α changes. The roller support 14 can be fixed in the desired position on the base support 5 via corresponding screws or the like.

Figure 4:
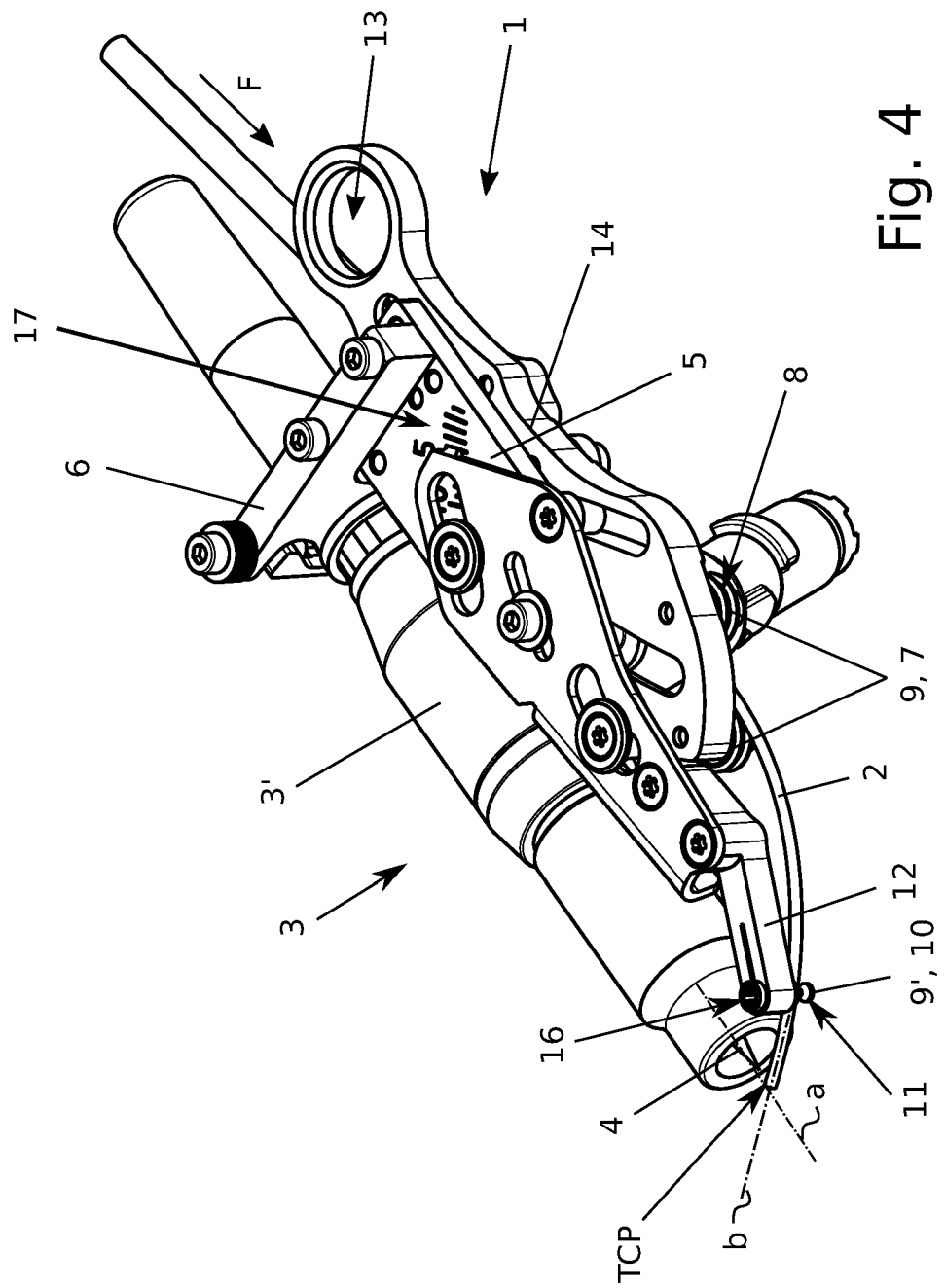
FIG. 4 shows a different view onto the welding torch comprising the feed device according to FIG. 3.

FIG. 4 shows a different view onto the welding torch 3 comprising the feed device 1 according to FIG. 3. Markings 17, which display the corresponding adjustment of the roller support 14 with respect to the base support 5 for a desired feed angle α, are thereby visible on the base support 5.

Figure 5:
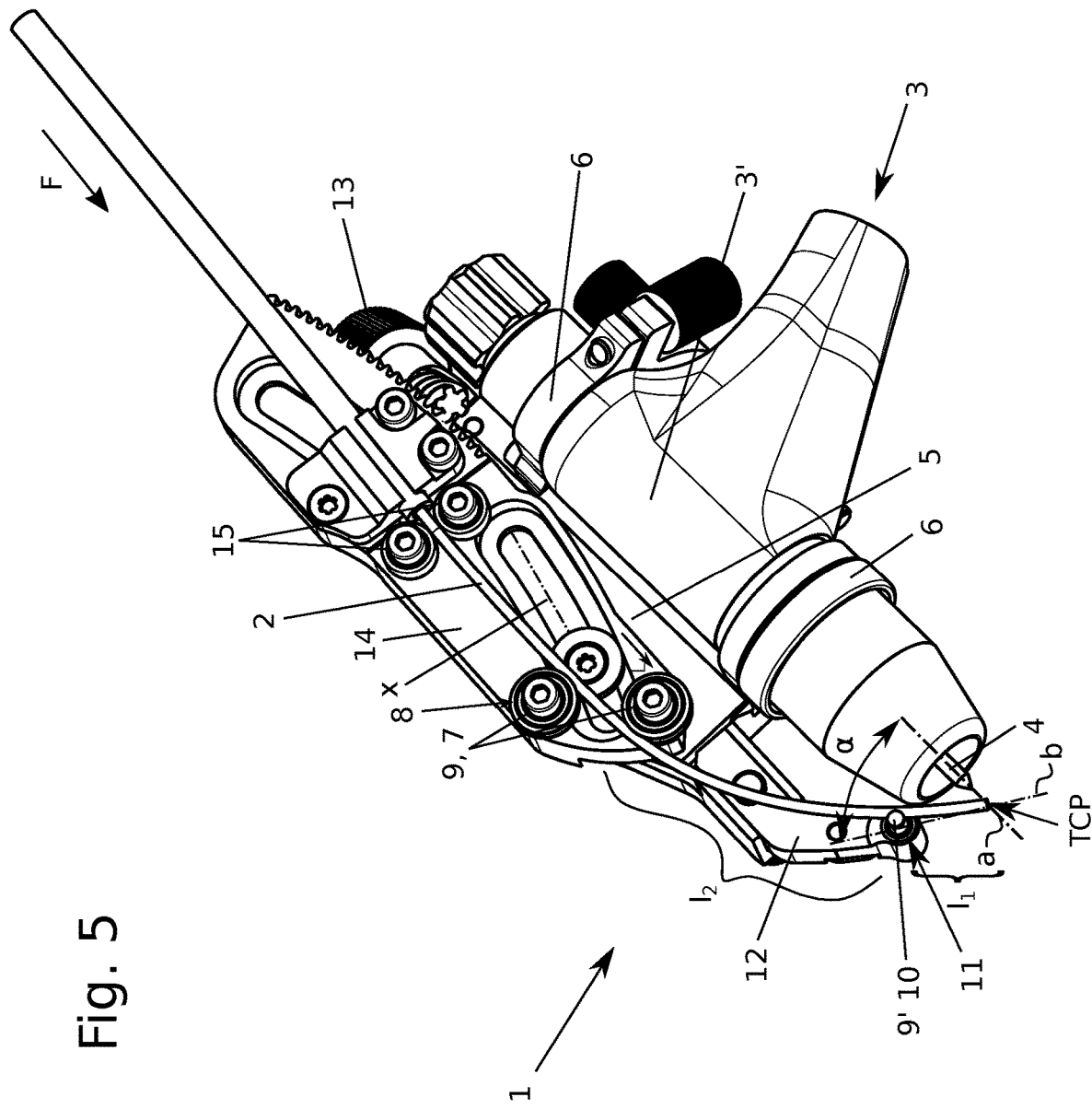
FIG. 5 shows a welding torch comprising a further exemplary embodiment of a feed device comprising adjustable deflection elements in the case of an acute feed angle.

FIG. 5 shows a welding torch 3 comprising a further exemplary embodiment of a device 1 attached thereto for feeding a consumable welding wire 2 towards the tool center point TCP. In this case, the feed angle α of the welding wire 2 is an acute angle. For the simple and quick adjustment of the feed angle α of the welding wire 2 towards the tool center point TCP with essentially constant TCP, the deflection elements 9 formed as rollers 7 are arranged on a roller support 14, which is adjustably connected to the base support 5. The last deflection element 9', which is formed as sliding pin 10, on the pin support 12 is also connected to the roller support 14 in a movably coupled manner. The roller support 14 can be adjusted continuously with respect to the base support 5 along an arcuate slotted guide path x. The adjustment of the feed angle α can take place in a particularly simple and quick way via a corresponding actuating element 13, whereby the roller support 14 comprising the rollers 7 and possibly further rollers 15 is moved along the arcuate slotted guide path x with respect to the base support 5. The movement of the last deflection element 9' also takes place in a coupled manner with the movement of the roller support 14. The positions of the deflection elements 9, 9' are thus changed accordingly, so that the feed angle α changes.

Figure 6:
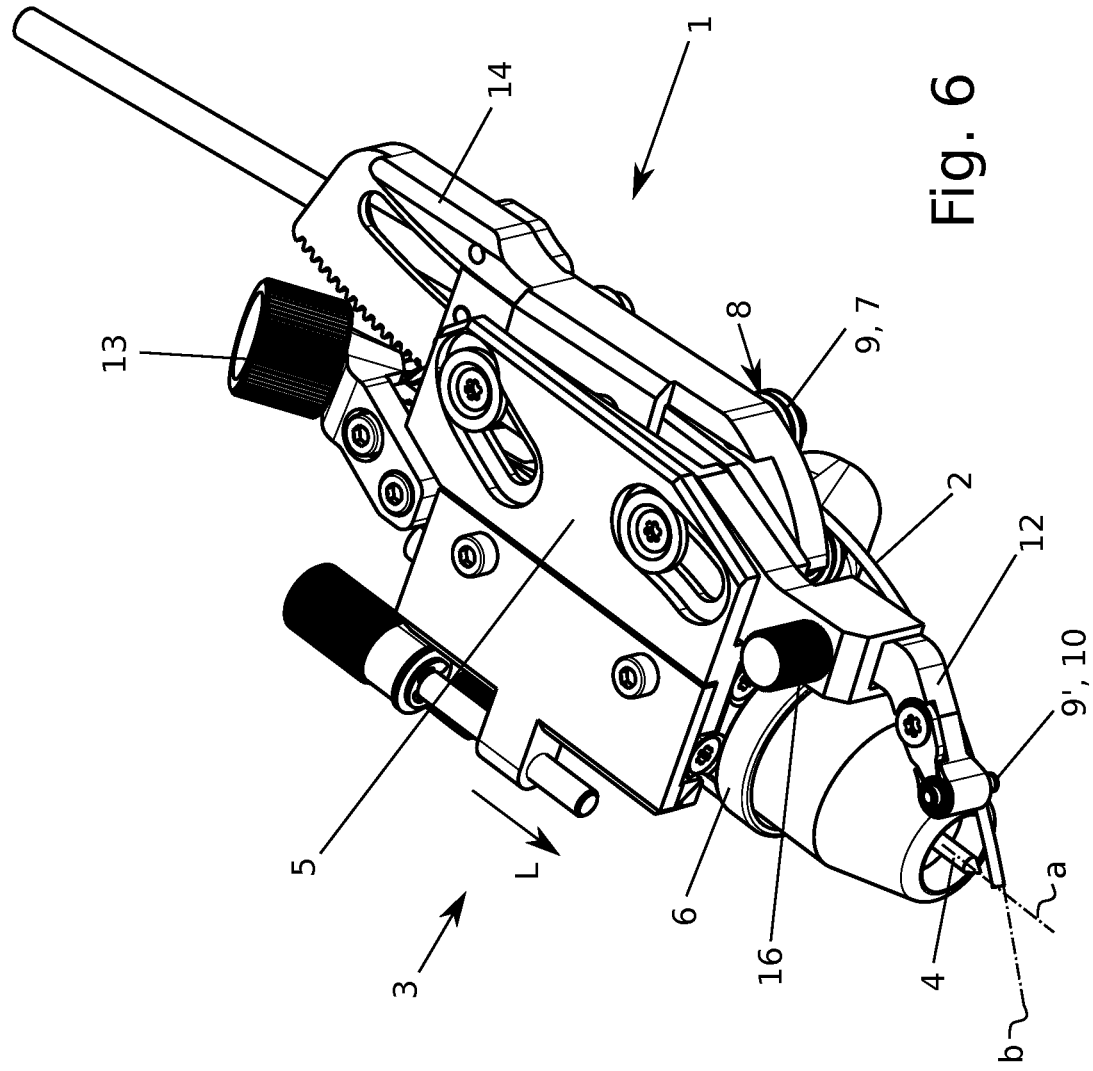
FIG. 6 shows a different view onto the welding torch comprising the feed device according to FIG. 5.

FIG. 6 shows a different view onto the welding torch 3 comprising the feed device 1 attached thereto for the welding wire 2 according to FIG. 5 in the case of an acute feed angle α. The last deflection element 9' can be adjusted essentially transversely to the base support 5, i.e. at a right angle to that plane, in which the welding wire 2 lies along the second path length $l_2$, via an actuating element 16. The base support 5 can also be adjustably arranged in the longitudinal direction L of the welding torch 3.

Figure 7:
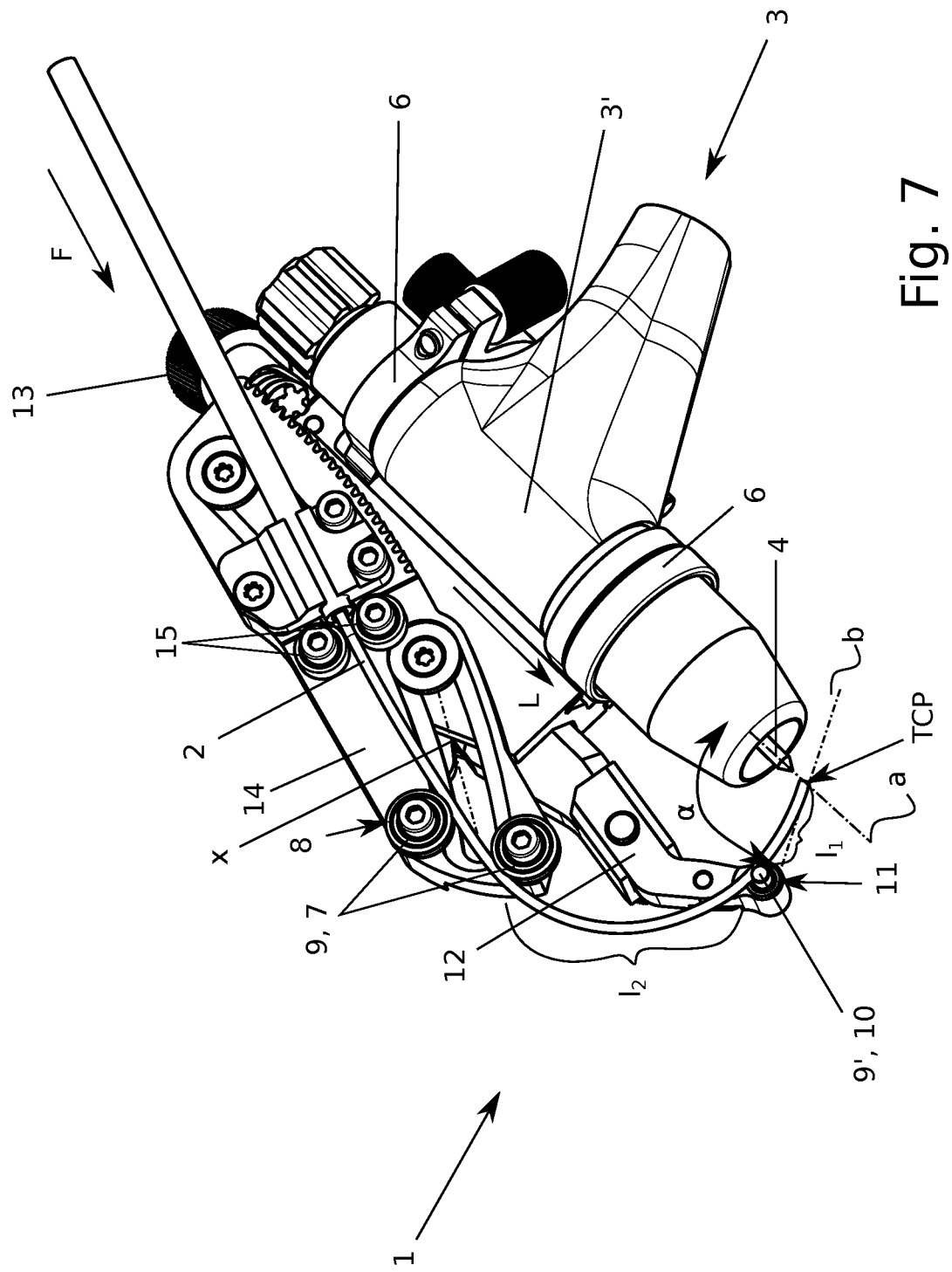
FIG. 7 shows the welding torch comprising the feed device according to FIG. 5 in the case of adjusted deflection elements for attaining an obtuse feed angle.

FIGS. 7 and 8 show the welding torch comprising the feed device 1 according to FIGS. 5 and 6 in the case of correspondingly adjusted deflection elements 9, 9' to attain an obtuse feed angle α.

Figure 9A:
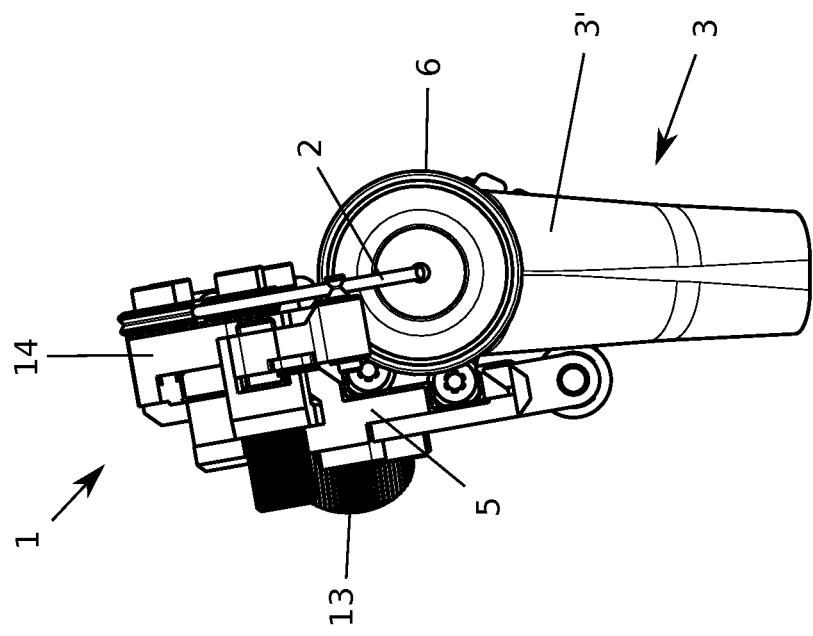
FIG. 9A shows a view onto the welding torch comprising a feed device attached thereto according to FIGS. 7 and 8 from the front.
Figure 9B:
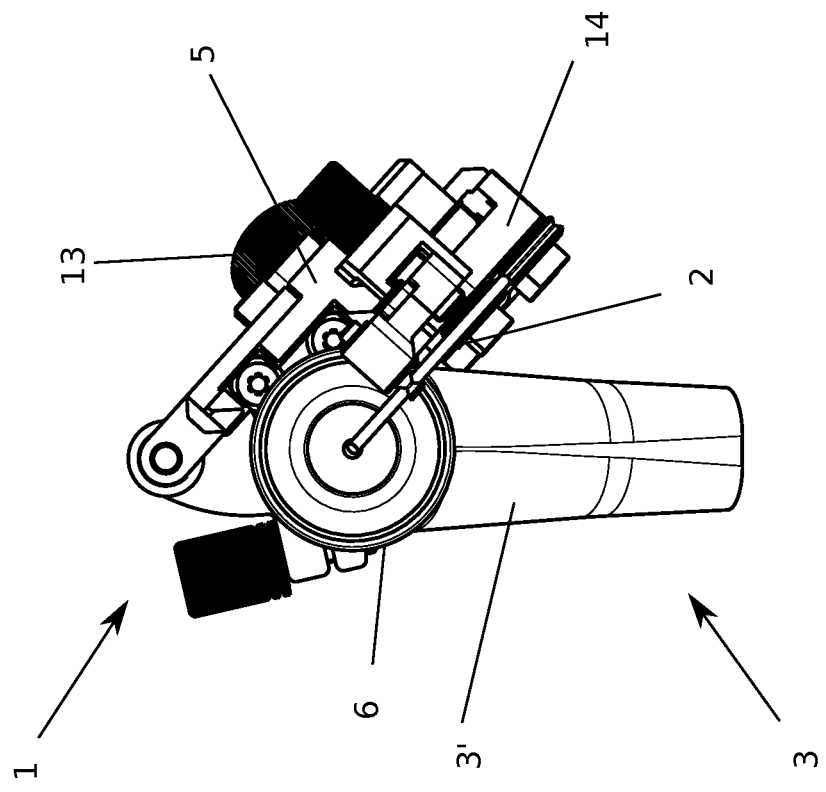
FIG. 9B shows a view onto the welding torch comprising a feed device attached thereto according to FIGS. 7 and 8 from the front with a feed device, which is arranged so as to be rotated compared to FIG. 9A.

FIG. 9A shows a view onto a welding torch 3 comprising the feed device 1 from the front. The attachment means 6 is thereby formed for the rotatable connection to the welding torch 3. According to the desired welding task, the feed device 1 can thus be attached to the welding torch 3 or torch body 3', respectively, in a position, which is suitable for the welder. FIG. 9B shows a view onto the welding torch 3 comprising the feed device 1 from the front in a position, which is rotated compared to FIG. 9A.

It applies for the embodiments according to the preceding FIGS. 3 to 9B that the roller support 14 and the pin support 12 can be adjusted in a coupled manner and that this takes place by means of elongated holes and journals. Roller supports 14 and pin supports 12 are arranged displaceably and are embodied adjustably, so that the deflection elements 9 and 9' are kinematically coupled by means of a control element. The control element can be embodied, for example, as a journal moving along the arcuate slotted guide path x or also as articulated rod.

In summary, it applies that the deflection element 9 as well as the last deflection element 9' have at least one so-called support point. When the deflection element 9 has a groove, comprising a, for example, V-shaped or U-shaped cross section, two and more support points result for each deflection element 9—but to be functionally considered to be one support point. In one support point, the welding wire 2 operationally contacts one deflection element. In the case of the (functional) support point of deflection element 9 or of one of the deflection elements 9, the greatest bending moment occurs operationally in the welding wire 2. A support point is to thus be understood essentially as contact point of welding wire 2 and deflection element 9, 9', due to which low feed forces result in an advantageous manner, with which the welding wire 2 is bent into the melting zone. As a function of its properties, such as, for example, thickness, material, or its pre-bending, respectively, the welding wire 2 can be guided by different numbers of support points of a deflection element 9, 9'. A path length $l_1$ or $l_2$, respectively, is that part, along which the welding wire 2 is moved in the main feed direction F, and, in the case of path length $l_1$, is limited by the tool center point TCP and the last support point of the last deflection element 9' located closest to the TCP, or, in the case of the path length $l_2$, respectively, is limited by the last support point and the support point of the further deflection element 9 or the deflection element 9 located behind it, respectively, as viewed counter to the main feed direction F, advantageously by means of that one of the support points, at which operationally the greatest bending moment occurs in the welding wire 2. The path lengths 11 and 12 are to thus be understood as part of a path, along which the welding wire 2 is operationally fed, wherein the path is to essentially be understood as curve. The length of a path length is to thus be understood as curve length. Depending on the arrangement of the deflection elements 9, 9', a shape of the path results, which can be designed freely accordingly. With regard to the segment heights $h_1$ and $h_2$, and analogously to a circular arc, the segment height is to be understood as greatest normal distance between the straight line, which goes through the two end points of the path length, and a point on the path length, wherein the path length, viewed as curve, virtually overlaps with the center points of the cross sections of the welding wire 2. The segment height is to be seen as the greatest bulge of a path length, wherein the greatest bulge of the path length $l_2$ in practice lies in a range of greater than 2 mm, in particular between 2 mm and 60 mm. In turn, a space around the point with the greatest bulge of the path length $l_2$ represents a space for movement for the welding wire 2. Due to the fact that the required feed force for the welding wire 2 generally increases with the number of the support points, it is particularly advantageous to arrange such a space for movement for the welding wire on the path length $l_2$, so that the welding wire 2 can bulge inside this space for movement, sometimes more or sometimes less, as required. It is advantageous when the space for movement is arranged at the point of the maximum bulge of the second path length 12 and when the space for movement extends essentially in the direction of and in the opposite direction of the maximum bulge of the second path length $l_2$, and is more than 3 mm, in particular more than 5 mm, in total. Such a space for movement for the welding wire can also be provided when the welding wire contacts the bending element approximately in a resilient or displaceable support point.

The tool center point TCP preferably lies in the region of the melting zone of the welding torch. This melting zone is that region of the welding torch, which is able to consume the fed welding wire.

The present invention shows a welding torch 3, in particular a TIG welding torch, comprising at least one feed device 1 for feeding a consumable welding wire 2 towards the tool center point TCP of the welding torch 3, which allows for an optimal and friction-free feeding.

The invention claimed is:

1. A welding torch comprising a torch body and at least one device for feeding a consumable welding wire towards a tool center point,
    wherein at least one feed device has an attachment means for attachment to the welding torch or an element connected thereto, comprising a base support, which is connected to the attachment means and comprises at least two deflection elements for guiding the welding wire towards the tool center point,
    wherein the at least two deflection elements comprise a first deflection element arranged on the base support and located closest to the tool center point and a second deflection element arranged on the base support and located farther from the tool center point then the first deflection element,
    wherein the welding wire has a first path length extending between the first deflection element and the tool center point and a second path length extending between the first deflection element and the second deflection element,
    wherein the at least two deflection elements are arranged on the base support in such a way that the first path length of the welding wire is shorter than the second path length of the welding wire as viewed counter to a main feed direction of the welding wire
    wherein the at least two deflection elements are further arranged on the base support in such a way that the welding wire, which runs arcuately, has a greater segment height along the second path length than a segment height along the first path length, and
    wherein a position of at least one deflection element of the at least two deflection elements is capable of being adjusted relative to the base support, so that a feed angle of the welding wire towards the tool center point is capable of being changed with the tool center point remaining constant.

2. The welding torch according to claim 1, wherein at least one deflection element of the at least two deflection elements is adjustable in a direction transverse to the base support.

3. The welding torch according to claim 1, wherein the at least two deflection elements further comprise a third deflection element and the welding wire is guided between the second deflection element and the third deflection element.

4. The welding torch according to claim 1, further comprising a second base support, wherein at least two additional deflection elements are arranged on the second base support and wherein a position of at least one deflection element of the at least two deflection elements or of the at least two additional deflection elements is capable of being adjusted for attaining different feed angles by exchanging the base support and the second base support.

5. The welding torch according to claim 1, wherein at least one deflection element of the at least two deflection elements is arranged on a roller support, which roller support is adjustably connected to the base support for adjusting the position of the at least one deflection element.

6. The welding torch according to claim 5, wherein the roller support is continuously adjustable relative to the base support along an arcuate slotted guide path.

7. The welding torch according to claim 5, wherein the roller support can be connected to the base support (5) in a plurality of different positions.

8. The welding torch according to claim 1, wherein the first is arranged on a pin support.

9. The welding torch according to claim 8, wherein the second deflection element is arranged on a roller support and the first deflection element arranged on the pin support is coupled to the second deflection element so as to be capable of being adjusted with respect to the base support.

10. The welding torch according to claim 1, wherein at least one deflection element of the at least two deflection elements is formed by means of at least one sliding pin.

11. The welding torch according to claim 1, wherein at least one deflection element of the at least two deflection elements is formed by means of at least one roller.

12. The welding torch (3) according to claim 10, wherein at least one of the at least one sliding pin and at least one roller has a groove for the welding wire.

13. The welding torch (3) according to claim 1, wherein the attachment means provides a releasable connection to the welding torch or to an element connected thereto.

14. The welding torch according to claim 1, wherein the welding torch is a TIG welding torch.

15. The welding torch according to claim 2, wherein the first deflection element is adjustable in a direction transverse to the base support.

16. The welding torch according to claim 8, wherein the pin support is connected adjustably to the base support.

17. The welding torch according to claim 10, wherein the first deflection element is formed by means of the at least one sliding pin.

18. The welding torch according to claim 10, wherein the at least one sliding pin is mounted in a rotatable manner.

19. The welding torch according to claim 13, wherein the attachment means provides a rotatable connection to the welding torch or to an element connected thereto.

* * * * *